US012808689B2

(12) United States Patent
Mueller et al.

(10) Patent No.: US 12,808,689 B2
(45) Date of Patent: Nov. 24, 2026

(54) METHOD FOR VERIFYING A DIGITAL MAP OF A ROAD SECTION

(71) Applicant: Robert Bosch GmbH, Stuttgart (DE)

(72) Inventors: Johannes Christian Mueller, Stuttgart (DE); Michael David Warren, Tuebingen (DE); Steffen Waeldele, Renningen (DE); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 19/043,757

(22) Filed: Feb. 3, 2025

(65) Prior Publication Data

US 2025/0258014 A1 Aug. 14, 2025

(30) Foreign Application Priority Data

Feb. 13, 2024 (DE) ..................... 10 2024 201 278.5

(51) Int. Cl.
*G01C 21/00* (2006.01)

(52) U.S. Cl.
CPC ..... *G01C 21/3859* (2020.08); *G01C 21/3837* (2020.08)

(58) Field of Classification Search
CPC ........................ G01C 21/3859; G01C 21/3837
USPC .......................................................... 701/446
See application file for complete search history.

(56) References Cited

U.S. PATENT DOCUMENTS

| | | | | |
|---|---|---|---|---|
| 2009/0271358 | A1* | 10/2009 | Lindahl | G06N 7/01 706/51 |
| 2020/0182629 | A1* | 6/2020 | Alawieh | H04W 4/46 |
| 2021/0182631 | A1* | 6/2021 | Baker | G06N 20/10 |
| 2021/0403012 | A1* | 12/2021 | Keller | B60W 50/0205 |
| 2022/0092271 | A1* | 3/2022 | Nordmann | G06F 8/10 |
| 2022/0155095 | A1* | 5/2022 | Svensson | G01C 21/3859 |
| 2022/0340160 | A1* | 10/2022 | Nayhouse | B60W 60/001 |

FOREIGN PATENT DOCUMENTS

| | | | |
|---|---|---|---|
| DE | 102017211613 | A1 | 1/2019 |
| DE | 102020115743 | A1 | 12/2021 |

* cited by examiner

*Primary Examiner* — Hitesh Patel
*Assistant Examiner* — John D Holman
(74) *Attorney, Agent, or Firm* — NORTON ROSE FULBRIGHT US LLP

(57) ABSTRACT

A method for verifying a digital map of a road section. The method includes: receiving environmental sensor data based on a detection of the road section by an environmental sensor; ascertaining, based on the environmental sensor data, a feature of the road section having a first tolerance; verifying, based on the ascertained feature of the road section, a feature of the digital map corresponding to the ascertained feature and having a second tolerance, wherein a set-based method using the two tolerances is used to verify the feature of the digital map, in order to ascertain a verification result, wherein one or more assumptions are made for the set-based method, assessing a reliability of the one or more assumptions by using a probabilistic method; verifying the digital map based on the verification result and based on the probabilistic reliability assessment.

10 Claims, 6 Drawing Sheets

METHOD FOR VERIFYING A DIGITAL MAP OF A ROAD SECTION

CROSS REFERENCE

The present application claims the benefit under 35 U.S.C. § 119 of German Patent Application No. DE 10 2024 201 278.5 filed on Feb. 13, 2024, which is expressly incorporated herein by reference it in entirety.

FIELD

The present invention relates to a method for verifying a digital map of a road section, to a device, to a computer program, and to a machine-readable storage medium.

BACKGROUND INFORMATION

High-resolution road maps, so-called high-definition (HD) maps, are a basis for automated driving functions. In this respect, it is crucial that an HD map is reliably updated to the latest version. Creating and maintaining such maps can be very time-consuming since it is necessary, for example, to carry out measurement runs and to process the data manually. This can prevent effective scaling of the HD maps and thus of automated driving functions.

SUMMARY

An object of the present invention is to provide a concept for efficiently verifying a digital map of a road section.

This object may be achieved by means of certain features of the present invention. Advantageous embodiments of the present invention are disclosed herein.

According to a first aspect of the present invention, a method for verifying a digital map of a road section is provided.

According to an example embodiment of the present invention, the method comprises the following steps:

- receiving environmental sensor data based on a detection of the road section by an environmental sensor,
- ascertaining, based on the environmental sensor data, a feature of the road section having a first tolerance,
- verifying, based on the ascertained feature of the road section, a feature of the digital map corresponding to the ascertained feature and having a second tolerance, wherein a set-based method using the two tolerances is used to verify the feature of the digital map, in order to ascertain a verification result, wherein one or more assumptions are made for the set-based method,
- assessing a reliability of the one or more assumptions by using a probabilistic method,
- verifying the digital map based on the verification result and based on the probabilistic reliability assessment.

According to a second aspect of the present invention, a device is provided, which is configured to perform all steps of the method according to the first aspect of the present invention.

According to a third aspect of the present invention, a computer program is provided which comprises instructions which, when a computer program is executed by a computer, for example by the device according to the second aspect, cause this computer to perform a method according to the first aspect of the present invention.

According to a fourth aspect of the present invention, a machine-readable storage medium is provided, on which the computer program according to the third aspect of the present invention is stored.

According to the present invention, the above object may be achieved by using a combination of a set-based approach and a probabilistic approach. In other words, it is provided that, on the one hand, a set-based method is used, wherein one or more assumptions are made for this method. On the other hand, it is provided that a probabilistic method is used to assess a reliability of the one or more assumptions.

The additional probabilistic assessment of the assumptions improves the meaningfulness of the guarantees resulting from the application of the set-based method.

Furthermore, this brings about the advantage that, for example, for the set-based method, it is also possible to make assumptions that are incorrect with a residual probability considered acceptable, for example by truncating before a probability distribution. This advantageously improves the precision of the verification result.

A correspondingly automatically verified digital map can thus additionally have a guarantee of accuracy, so that automated driving functions that want to use the digital map can be performed based on the guarantee. In other words, it may be provided, for example, that, in the case of a digital map having such a guarantee, a higher automated driving function is permitted than without a guarantee.

This, in particular, brings about the technical advantage that a digital map of a road section can be efficiently verified.

In one example embodiment of the method of the present invention, the one or more assumptions are each an element selected from the following group of assumptions: assumption that the ascertained feature confirms a position of the feature of the digital map, assumption that the ascertained feature is actually present, assumption that static objects not recorded in the digital map were not systematically overlooked, assumption that there are no systematic errors, assumption that the digital map has not changed since its last update.

This, for example, brings about the technical advantage that particularly suitable assumptions can be made.

In one example embodiment of the method of the present invention, the probabilistic method is one of the following probabilistic methods: subjective logic, Dempster-Shafer theory, classical probability theory, in particular Bayesian inference.

This, for example, brings about the technical advantage that particularly suitable probabilistic methods can be used.

In one example embodiment of the method of the present invention, the probabilistic method is subjective logic, wherein a subjective logic opinion is set up in each case for each of the one or more assumptions, wherein the respective subjective logic opinions are merged to form an overall result, which is projected onto a residual probability based on which the digital map is verified.

In other words, the following is provided, for example: the probabilistic method is subjective logic; for each of the at least one assumptions, one subjective logic opinion is set up in each case, for example; the respective subjective logic opinions are, for example, merged to form an overall result; the overall result is, for example, projected onto a residual probability. Based on this residual probability, the digital map is verified.

This, for example, brings about the technical advantage that the digital map can be verified efficiently.

In one example embodiment of the method of the present invention, if the ascertained feature is a temporary obstacle, a separate subjective logic opinion is set up in each case for the temporary obstacle and is merged with the respective subjective logic opinions to form the overall result.

This, for example, brings about the technical advantage that a temporary obstacle can be dealt with efficiently in order to verify the digital map.

In one example embodiment of the method of the present invention, the tolerance of each feature in each case indicates a range within which the corresponding feature is located, wherein it is ascertained which overlap the ranges have, wherein the digital map is verified based on the ascertained overlap.

This, for example, brings about the technical advantage that the digital map can be verified efficiently.

For example, if the first tolerance is completely within the second tolerance, it is determined, for example, that the digital map is verified.

In one example embodiment of the method of the present invention, if there is no overlap, it is determined that the digital map has not been verified.

This, for example, brings about the technical advantage that it can be efficiently determined that the digital map has not been verified.

In other words, if there is no overlap, the ascertained feature was definitely not recognized at the recorded location on the digital map.

In one example embodiment of the method of the present invention, based on the verification, the digital map is approved for use for an automated driving function.

This, for example, brings about the technical advantage that an automated driving function can be approved efficiently.

An automated driving function is in particular a driving function for an at least partially automated motor vehicle. An automated driving function may, for example, include infrastructure-supported assistance of a motor vehicle.

Environmental sensor data within the meaning of the description have been ascertained, for example, by using one or more environmental sensors of one or more motor vehicles and/or one or more environmental sensors that are spatially distributed within an infrastructure comprising the road section. In other words, it is provided, for example, that one or more motor vehicles, each comprising one or more environmental sensors, drive or have driven within the road section and have detected their particular environment by means of the environmental sensors during the trip, so that the corresponding environmental sensor data describe or represent the road section.

For example, the method of the present invention explicitly comprises the step of detecting the road section by one or more environmental sensors, in particular of one or more motor vehicles, and/or by environmental sensors of the infrastructure.

The step of receiving environmental sensor data based on a detection of the road section by an environmental sensor can thus be extended, for example, as follows: receiving environmental sensor data based on multiple detections of the road section by one or more environmental sensors.

For example, it is provided that a motor vehicle passes through the road section multiple times, and therefore corresponding environmental sensor data are ascertained for each trip.

For example, it may be provided that multiple motor vehicles pass through the road section, and therefore multiple environmental sensor data describing the road section are thereby ascertained in each case.

Environmental sensor data within the meaning of the description describe or represent the road section.

One or more or all of the method steps of the present invention may, for example, be carried out by one or more of the following instances: motor vehicle, remote server, i.e., a server that is remote from a motor vehicle, for example a so-called edge server. An edge server is a server that is part of an edge infrastructure.

In other words, it may be provided, for example, that an individual motor vehicle ascertains environmental sensor data during each of multiple trips through a road section and, based on these environmental sensor data, verifies a digital map of the road section.

For example, it may be provided that the motor vehicle itself creates the digital map beforehand.

For example, it may be provided that the motor vehicle sends the environmental sensor data to a remote server, which subsequently uses them to verify the digital map.

The method is, for example, a computer-implemented method.

The device is, for example, configured in terms of program technology to execute the computer program.

Statements made in connection with one assumption apply analogously to multiple assumptions, and vice versa.

The digital map of the road section may, for example, be an HD map. Here, "HD" stands for "high-definition"; an HD map is thus a high-resolution map.

For example, the HD map may be divided into multiple route sections, each of which can be derived from so-called SD maps. Here, "SD" stands for "single-definition"; an SD map is thus a single-resolution map.

In other words, for example, as part of mapping the road section through multiple trips through the road section, a motor vehicle can create an SD map each time based on the respective environmental sensor data, based on which SD maps an HD map of the road section is created, wherein this road section is verified, for example, according to the concept described here.

In the statements below, the term "agent" is used. Such an "agent" is in particular a motor vehicle comprising one or more environmental sensors for detecting the road section.

The term "map server" in the statements below means a map server.

An environmental sensor within the meaning of the description is, for example, one of the following environmental sensors: radar sensor, image sensor, in particular an image sensor of a video camera, LiDAR sensor, ultrasonic sensor, infrared sensor, and magnetic field sensor.

The term "sensor" used in this description stands for "environmental sensor."

The following terms are explained as follows.

Subjective Logic

Subjective logic is an extension of the classical probability theory for small samples. It was largely developed by Audun Jøsang and his research group. The main idea of subjective logic is similar to the Dempster-Shafer theory, the latter being included as a special case in subjective logic. A special feature of the theory is that it contains not only first-order probability masses but also a statistical uncertainty, which corresponds to a second-order probability. It indicates how certain the estimated first-order probabilities are. Accordingly, probabilistic statements about reliability or truth can be well modeled using subjective logic, taking into account limited knowledge.

The core element of subjective logic is the so-called subjective logic opinion. Subjective logic opinions can be combined by means of various operators defined within the subjective logic theory. Each operator has its own semantics, which is assigned to the result accordingly.

Since subjective logic is related to the Dempster-Shafer theory and also classical probability theory (e.g., Bayesian inference), they are mentioned as alternative procedures.

Subjective Logic Opinion

A subjective logic opinion ω(b, u, a) consists of three components: a belief mass vector b, a measure of the statistical uncertainty u, and a vector for the statistical prior a. The vectors have the dimension of the number of elementary events, u is a scalar, where the entries of b and u add up to one.

Projected Probability

The projected probability is a probability that results from the projection of a subjective logic into the probability space. In this case, statistical uncertainty is filled with the statistical prior, so that the belief masses add up to one.

Bijective Mapping

Subjective logic opinions have a direct representation as Dirichlet distributions. By means of bijective mapping, a subjective logic opinion can be mapped to its corresponding Dirichlet distribution, and vice versa.

Dirichlet Distribution

The Dirichlet distribution (named after Peter Gustav Lejeune Dirichlet) is a family of continuous, multivariate probability distributions.

Trust Discounting

Operation from the subjective logic theory in which belief mass from a subjective logic opinion is converted into statistical uncertainty. This makes it possible, for example, to model the loss of knowledge due to the aging of information.

Cumulative Belief Fusion Operator

Operator from the subjective logic theory which corresponds to Bayesian inference.

Weighted Average Belief Fusion Operators

Operator from the subjective logic theory which combines multiple subjective logic opinions to become more precise but not more certain. That is to say, the statistical uncertainty of the result is greater than or equal to the minimum statistical certainty of the input of subjective logic opinions.

Dempster-Shafer Theory

The evidence theory of Dempster and Shafer, also known as the theory of belief functions, is a mathematical theory from the field of probability theory. It is used to combine information from different sources by means of the so-called Dempster rule of combination to form an overall statement, wherein the credibility of these sources is taken into account in the calculation.

Set-Based Approaches

Set-based approaches represent the uncertainty of a measurement in the form of sets within which the measurement can be. A typical example of set-based approaches is interval methods. Due to the worst-case estimates of the set-based methods, their statements are not only probable but also absolute. Accordingly, the resulting statements are guaranteed, provided that the assumptions underlying the statements are correct.

When the plural for "set-based method" and for "probabilistic method" is used in the description, the singular is always implied, and vice versa.

For example, the use of sensor data from networked vehicles (fleet data) and/or from an intelligent infrastructure is provided in order to create or build the digital map of the road section. Such a motor vehicle or such an intelligent infrastructure unit is referred to as an agent below. In contrast to conventional methods, however, the method described here also estimates the reliability of the map, for example directly. Used for this purpose is in particular a combination of set-based approaches or methods and probabilistic methods, i.e., in particular a combination of a set-based method and a probabilistic method. In order to obtain the strongest possible guarantees and, on the other hand, to be able to limit disruptive events as much as possible, the HD map is divided into route sections or road sections. These sections can be derived from single-definition maps.

For example, at least one agent collects sensor data, generates, for example, an HD map segment therefrom and sends it to a map server, for example. In addition, at least one agent verifies, for example, existing, unverified map sections on the basis of sensor data and sends the verification result to the map server, for example. This map server, for example, aggregates the incoming information and, for example, approves the map sections that have been verified with sufficient accuracy. The incoming information is aggregated, for example, by a combination of one or more set-based and one or more probabilistic methods. For example, at least one agent receives the verified map sections, checks, for example, whether the approval of the current map section is plausible, and uses the corresponding map section accordingly for an automated driving function. In addition, the agent communicates, for example, the result of the plausibility check as feedback to the map server. The map server updates the HD map on the basis of the feedback, for example. Communication may, for example, take place via Vehicle-to-Everything (V2X), Infrastructure-to-Everything (I2X) communication, and/or an ordinary Internet connection.

A particular advantage results from the implementation as a multi-agent system with many, in particular heterogeneous, agents with different capabilities. For example, it is provided to execute the map server as an edge server. This minimizes latencies and provides the agents with map updates in real time. For example, urgent map updates can be distributed with low latency to all affected agents on the corresponding map segment via broadcast. All other, less time-critical map updates can, for example, be transmitted to the agents via an ordinary Internet connection as soon as the connection is established.

A special case is the so-called commuter mode, in which the multi-agent system consists, for example, of a single motor vehicle. In this case, the map server can also be implemented as a component in the motor vehicle, and the need for V2X communication is eliminated.

The following advantages can be achieved based on the concept described here:

The additional probabilistic assessment of the assumptions improves the meaningfulness of the guarantees resulting from the application of the set-based methods.

For the set-based methods, it is also possible to make assumptions that are incorrect with a residual probability considered acceptable (e.g., truncation of probability distributions). This improves the precision of the results.

An automatically created HD map additionally contains guarantees about its accuracy The HD map can be fully automatically created and verified/checked for plausibility virtually in real time.

Advantage: users of the map are quickly informed about map changes and possible discrepancies/obstacles and can respond correspondingly quickly The method can handle heterogeneous agents (different capabilities, different trustworthiness). The method can use data from many different agents and thus access more resources for mapping The method can use data from agents of different manufacturers and thus reaches a wide range of applications (e.g., networked motor vehicles of different manufacturers).

The method can use data from agents with different skill levels and thus reaches a wide range of applications across products of different price ranges.

The following use cases can be provided:

Case 1: The Route Section is Not Yet Mapped

In this case, the agent cannot yet use the HD map to support an automated driving function, but, by mapping it, can create the precondition for another agent or the mapping agent to be able to use the map when returning later.

Any automated mapping method can be used for mapping. However, in addition to the mapping, an initial estimate of the uncertainty in the mapping is also provided. In order to be able to guarantee that the actual roadway boundaries are within the estimated uncertainties, a set-based approach is used to estimate the uncertainties. For example, a ray tracing approach can be used, which formulates the measurement uncertainties along the entire measurement chain as an interval, resulting in an area within which the road boundary is guaranteed to be located. Analogously, other map features, such as traffic signs, can be limited to areas within which they are guaranteed to be located.

For example, a distinction can be made between essential and non-essential map features. Non-essential map features do not necessarily have to be recognized in the sensor image depending on weather, occlusions, etc., so that their absence does not lead to loss of the guarantee. Examples of non-essential features include landmarks for localization.

For example, depending on the sensor quality of the agent, multiple measurement sequences are aggregated. A measurement sequence is, for example, the sequence of all measurements recorded by a networked motor vehicle when passing through the corresponding map section. Since the set-based methods guarantee that the measured object is guaranteed to be within the output set of possible locations, the intersection of these result sets leads to increasingly narrow limits. For example, enough measurement sequences are aggregated to achieve the required accuracy of the HD map.

Case 2: The Route Section Has Been Mapped But Has Not Yet Been Approved for an Automated Driving Function In this case, the agent cannot yet use the HD map to support an automated driving function, but, by validating it, can create the precondition for another agent or the mapping agent to be able to use the map when returning later.

While the mapping step aims to achieve the best possible guaranteed accuracy, the main goal here is to confirm the existing map with the greatest possible certainty. In order for a map section or road section or route section to be confirmed, the following properties must generally be fulfilled:

The drivable area, which is also called "free space," must cover the entire roadway.

All essential map features (e.g., traffic signs, road markings) must be recognized/confirmed at the position or location where they are entered in the digital map, i.e., the HD map.

In order to achieve this, set-based methods and probabilistic methods are combined. By means of set-based methods, the guaranteed drivable area can be ascertained. If it is large enough, the first requirement for the map section is confirmed. On the other hand, if static obstacles are recognized on the road, the confirmation is withdrawn.

For confirming the essential map features, a set-based method is again used first. The measurements generate areas within which the corresponding essential map features must be located. In the special case that the resulting areas are completely within the tolerance of the positions of the map features, the map section can be guaranteed to be confirmed. In general, however, a single measurement sequence is not sufficient to guarantee that the required accuracy is achieved. The set-based approach is therefore combined with a probabilistic approach. For this purpose, it is first checked whether the areas resulting from the set-based approach overlap with the corresponding map features. If this is not the case, the map feature was definitely not recognized at the recorded location. Accordingly, the confirmation is withdrawn. Otherwise, it is at least plausible that the map is correct.

If the map appears at least plausible, probabilistic methods are used to determine the residual probability that the reliability guarantee of the HD map is nevertheless violated, contrary to the assumption. The reliability guarantee of the HD map is violated if assumptions underlying the mapping process are violated. The advantage of set-based methods is that the assumptions underlying the result are explicitly known. Such assumptions are, for example:

- the assumption that the actual measured value confirms the position of the map feature,
- the assumption that the detected map features are actually present (i.e., the measurements are not false positives),
- the assumption that unrecorded static objects were not systematically overlooked (i.e., false negatives prevent the detection of obstacles),
- the assumption that there are no systematic errors (e.g., incorrect calibration can cause the HD map to be systematically shifted).
- the assumption that the HD map has not changed since the last update.

A particularly useful methodology for determining the residual probability is subjective logic. A subjective logic opinion $\omega(b, u, a)$ consists of three components: a belief mass vector b, a measure of the statistical uncertainty u, and a vector for the statistical prior a. The vectors have the dimension of the number of elementary events, u is a scalar, where the entries of b and u add up to one.

First, a subjective logic opinion is set up for each of the assumptions. For the subjective logic opinion for the first assumption that the measurements actually confirm the corresponding map features, it is possible to count, for example, how many measurements actually fall within the tolerance and how many fall outside it. If covariances are available, each measurement can be counted partly as within and partly as outside in proportion to its membership probability. The belief mass vector b and the statistical uncertainty u result from the corresponding number of measurements within and outside the tolerance. The statistical prior can be ascertained, for example, from the ratio of the areas of map feature with tolerance to the union of all areas that belong to the measurements and result by applying the set-based methods.

The subjective logic opinions for the second and third assumptions, i.e., about false positives and false negatives, are of an epistemic nature. They are derived from the specifications of the sensors and the detection methods used, as well as the number of measurement sequences from which the reliability was determined. In particular, possible common-cause errors must be taken into account. For this purpose, the verifying agent transmits not only the verification results but also a hash value describing the algorithm used. As a result, the mapping server can decide whether the same or different algorithms were used, but cannot track which algorithms are specifically used.

Reliability estimation methods and self-assessment methods make it possible to determine a subjective logic opinion about the assumption that there are no systematic errors in the agent. Redundant information from other agents or as a result of overlapping sensor coverage is used to check the perception results for consistency and plausibility.

For example, in order to assess the up-to-dateness assumption of the map in a subjective logic opinion, the timestamp at which the route section was last verified and the frequency with which the route is visited are primarily used. Additionally, statistical data that describe the probability of a relevant change are used, for example. For example, by means of the queueing theory, these data can be used to determine a probability that a relevant change has occurred since the last verification. For example, the subjective logic opinion can be constructed by building an initial subjective logic opinion on the basis of the verification results and then correcting it with the trust discounting operator according to the subjective logic theory and the probability that a change has occurred.

Further assumptions can be assessed, for example, by subjective logic opinions in a manner analogous to the procedure described here. For example, the individual subjective logic opinions are merged to form an overall result. The weighted average belief fusion operator can be used for this purpose, for example. The merged subjective logic opinion is then projected onto a residual probability, for example. The projected probability from subjective logic can be used for this purpose, for example. For example, the subjective logic opinion can be transformed into a Dirichlet distribution by means of the bijective mapping from the subjective logic theory and then integrated over a given confidence interval.

For example, a route section is approved for an automated driving function as soon as the mapping has been completed and the residual probability resulting from the verification has been reduced to an accepted level.

Case 3: The route Section is Approved

If the route section has the necessary approval for the automated driving function, the agent can use the map for the automated driving function. If the agent is an intelligent infrastructure unit, such a driving function can, for example, be guiding other networked and automated motor vehicles across an intersection.

For example, the agent can continue to check the HD map for plausibility in order, on the one hand, to confirm that the map is up to date and, on the other hand, to respond to changes in the road since the last passage. For the plausibility check of the map, the methodology for verification from case 2 can be reused, for example.

Dealing With Temporary Obstacles

Temporary obstacles include construction sites, accidents, or vehicles parked on the side of the road. In order to take these obstacles into account, the agents have perception systems that can recognize such temporary obstacles. If temporary obstacles are taken into account, it can no longer be guaranteed due to occlusions, for example, that all map features can be confirmed in every measurement sequence. Accordingly, the underlying mapping method is modified, for example.

During the initial mapping, places or locations that cannot be seen are interpolated, for example. The uncertainty ranges of the interpolated sections are, for example, correspondingly large, and more measurement cycles are used, for example, to guarantee that an HD map with the required tolerances is created.

For example, the verification of the map can become more complex since temporary obstacles can cause occlusions so that the entire roadway can no longer be recognized as guaranteed to be drivable. In this case, however, the map confirmation is not directly withdrawn, for example. Instead, the route section can be subdivided more finely, for example by means of a raster map. Raster cells into which measurements fall are marked as occupied accordingly; raster cells in the line of sight to the measurements are marked as free, and occluded cells are marked as unknown. Subjective logic or the Dempster-Shafer theory can be used, for example, to model the raster map. A map section or a road section is in this case approved, for example, for the raster cells that are recognized as definitely unoccupied. For example, occluded cells are neither confirmed nor discarded, but the timestamp of the measurement sequence does not apply to them either, so the certainty for these cells nevertheless decreases. If the certainty that a raster cell is drivable decreases to such an extent that the occupancy probability increases to above the accepted residual probability, it is entered into the map as a temporary obstacle, for example. If, for example, the overestimated temporary obstacles make the road width too narrow for a motor vehicle to pass through safely, the approval for the entire route section is withdrawn, for example. If unrecorded, non-temporary obstacles are detected, the approval is also withdrawn, for example.

If temporary obstacles are recognized, the set-based methods are used to make an overestimation within which the obstacle is guaranteed to be located. This overestimation is entered into the map as a temporary obstacle. Furthermore, for each temporary obstacle, for example, a subjective logic opinion that the temporary obstacle is actually still there is set up. For verification purposes, such a subjective logic opinion is determined, for example, from each measurement sequence for each temporary obstacle and is merged, for example, with the existing subjective logic opinion. Merging can be carried out, for example, with the cumulative belief fusion operator from the subjective logic theory. For example, the more often a temporary obstacle is seen, the higher the probability of its existence, for example. However, if a temporary obstacle is more often not detected, the probability of existence decreases. For example, if the probability of existence falls below an accepted level, the obstacle is removed from the map, which is called "pruning."

Dealing With Unreliable Agents

The agents that carry out the mapping are generally not homogeneous, but can differ considerably, for example, in their sensor equipment and processing quality. Accordingly, the quality of the measurement sequences differs, for example. If the measurement accuracy is correctly modeled, poorer measurement accuracies lead to larger uncertainty areas when applying the set-based methods, but have no impact on the method itself.

On the other hand, for the verification, it is important to consider, for example, how reliable and accurate the results are. In particular, this also applies, for example, to the probabilities of false detections (false positives and false negatives) and, for example, to the probability that systematic errors occur. For each agent, a subjective logic opinion about its reliability is therefore set up, for example, and its verification result is weighted, for example, with the reliability of the agent. One way to determine the reliability of agents, for example, is to use a trust management and misbehavior detection mechanism.

For example, the approval for an automated driving function is divided into multiple categories. For example, the stronger the approval, the fewer requirements there are for the automated driving function, for example. For example, it is provided that some automated driving functions cannot handle motor vehicles parked on the road. Route sections or road sections where this may occur are in this case not approved for the driving function, for example. An exemplary approval classification can contain the following categories, for example:

Suitable as a fallback level for extensive sensor failure: The guarantees are very extensive and the map is very up to date. In addition, the map must not have any major uncertainties such as the possible presence of temporarily static objects. An automated motor vehicle can use the map to continue driving despite extensive sensor failure.

Parking garage for automated valet parking (AVP): In a suitably equipped parking garage, it can be assumed that the route is always up-to-date and correspondingly accurate due to an appropriately installed static sensor system. For example, special landmarks are installed inside the parking garage for localization purposes. A motor vehicle can therefore rely completely on the map, which is guaranteed to be up-to-date and sufficiently accurate.

Suitable as a basis for automated driving functions: The guarantees are extensive and allow the map to be used as a basis for planning. The map carries the safety load as a fallback level or redundant safety path. At the same time, the map is nevertheless checked for plausibility during the passage. If a contradiction arises, the automated driving function can fall back to a mapless approach and at least bridge the faulty route section with greatly reduced performance.

Route section or road section contains temporary static objects: The guarantees are limited and a more complex driving functionality, namely the safe recognition and avoidance of blockages, must be provided.

Route section contains a construction site: Road markings in construction sites can confuse automated motor vehicles. Only perception systems that are sufficiently robust against such challenges may therefore be used, for example. For example, an automated driving function can rely on a guaranteed clearance, which was determined, for example, on the basis of the trajectory of a motor vehicle that drove through the construction site only a short time before.

Route section with urgent safety warning: An agent has reported a specific hazard on the route section. For example, a wrong-way driver, people on a highway section, parts lying around, or weather influences such as icy roads or a bank of fog can be the reason for such a danger warning. In this case, even a driving function that does not rely on an HD map will fall back to a particularly cautious driving style until the warning is lifted.

A particularly advantageous embodiment for determining the residual probability comprises subjective logic. However, the application of the Dempster-Shafer theory or Bayesian inference is also possible. Even more generally, scores can be used, for example, which increase monotonically with increasing estimated certainty and decrease accordingly when measurements contradict the map. For example, approval is granted if this score or these scores rise above a corresponding threshold value.

A particularly advantageous embodiment comprises the use of the weighted average belief fusion operator to determine the overall reliability. However, other combination options are also possible. For example, the minimum of the individual assessments can be used, or the probabilities derived from the reliability measure can be added (i.e., the corresponding elementary events can be linked by OR). For example, it is also provided to set threshold values for each individual assessment, wherein the map is, for example, only approved if, for example, all threshold values have been met.

For example, the trajectories actually driven by one or more motor vehicles are used to derive a reference line. This reference line can then, for example, serve as a pilot control for longitudinal and/or lateral guidance and thus support the most comfortable ride possible.

For example, camera sensors and/or radar sensors and/or LiDAR sensors and/or ultrasonic sensors can be used for detection. In addition, the trajectory of a motor vehicle can be used as an input for mapping. The trajectory is determined, for example, from the localization, which typically uses the odometry of the motor vehicle, a GNSS (e.g., GPS) and landmarks recognized in the sensor image of the other motor vehicle sensors. In addition, it is provided, for example, that the trajectories of other dynamic objects can also be used to determine areas that are guaranteed to be drivable.

For example, a commuter mode is provided, in which a single automated motor vehicle creates its own HD map in order to be able to drive routine routes on it automatically. The measurement sequences in this case result from the motor vehicle driving the same route sections over and over again.

The wording "at least one" means "one or more."

The present invention is explained in more detail below using preferred exemplary embodiments.

DETAILED DESCRIPTION OF EXAMPLE EMBODIMENTS

In the following, the same reference signs can be used for identical features.

Figure 1:
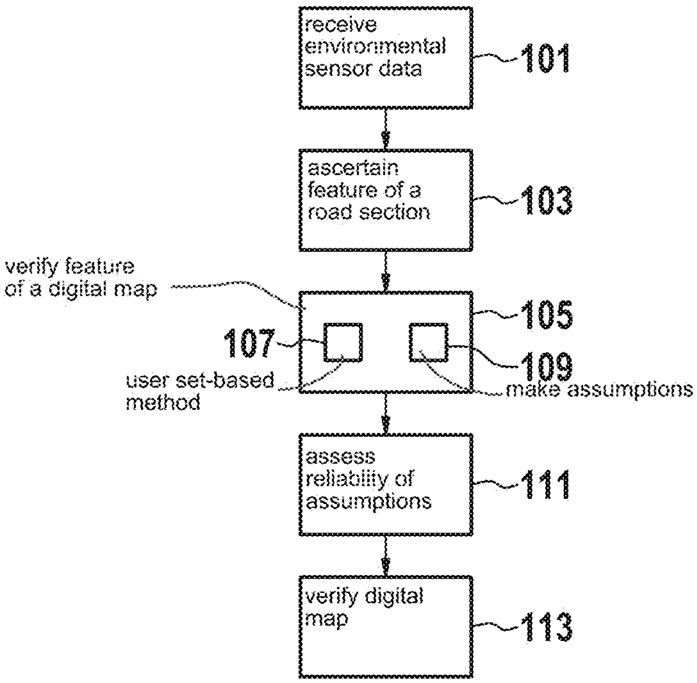
FIG. 1 shows a flow chart of an example method according to the first aspect of the present invention.

FIG. 1 shows a flow chart of a method for verifying a digital map of a road section, comprising the following steps:

receiving 101 environmental sensor data based on a detection of the road section by an environmental sensor, ascertaining 103, based on the environmental sensor data, a feature of the road section having a first tolerance, verifying 105, based on the ascertained feature of the road section, a feature of the digital map corresponding to the ascertained feature and having a second tolerance, wherein a set-based method using the two tolerances is used 107 to verify the feature of the digital map, in order to ascertain a verification result, wherein one or more assumptions are made 109 for the set-based method, assessing 111 a reliability of the one or more assumptions by using a probabilistic method, verifying 113 the digital map based on the verification result and based on the probabilistic reliability assessment.

Figure 2:
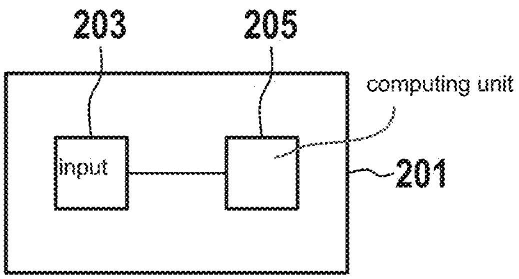
FIG. 2 shows a device according to the second aspect of the present invention.

FIG. 2 shows a device 201, which is configured to carry out all steps of the method according to the first aspect.

The device 201 comprises an input 203, which is configured to receive the environmental sensor data. The device 201 furthermore comprises a computing unit 205, which is configured to perform the steps of ascertaining, verifying, assessing the reliability, and verifying the digital map. The computing unit 205 is furthermore configured, for verifying the feature of the digital map, to use a set-based method using the two tolerances, in order to ascertain a verification result, wherein the computing unit 205 is configured to make one or more assumptions for the set-based method.

The device 201 may also be referred to as a device for verifying a digital map of a road section.

The input 203 is implemented as a communication interface, for example. For example, the device 201 comprises a communication interface, which is implemented separately from the input 203, wherein the communication interface is configured to communicate with a map server. The input 203 receives, for example, the environmental sensor data from environmental sensors of the motor vehicle.

Method features result analogously from corresponding device features, and vice versa. This therefore means that technical functionalities of the method result analogously from corresponding technical functionalities of the device, and vice versa.

The device is implemented in a cloud infrastructure, for example.

Figure 3:
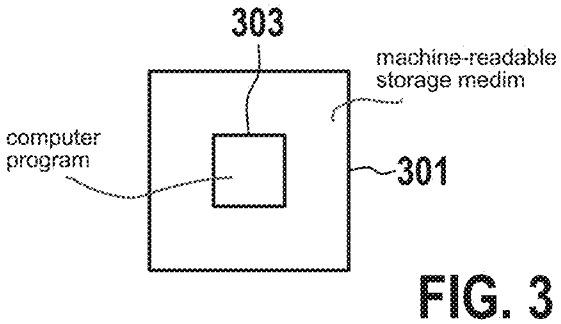
FIG. 3 shows a machine-readable storage medium according to the fourth aspect of the present invention.

FIG. 3 shows a machine-readable storage medium 301, on which a computer program 303 is stored. The computer program 303 comprises instructions that, when the computer program 303 is executed by a computer, e.g., by the device 201 of FIG. 2, cause the latter to carry out a method according to the first aspect.

Figure 4:
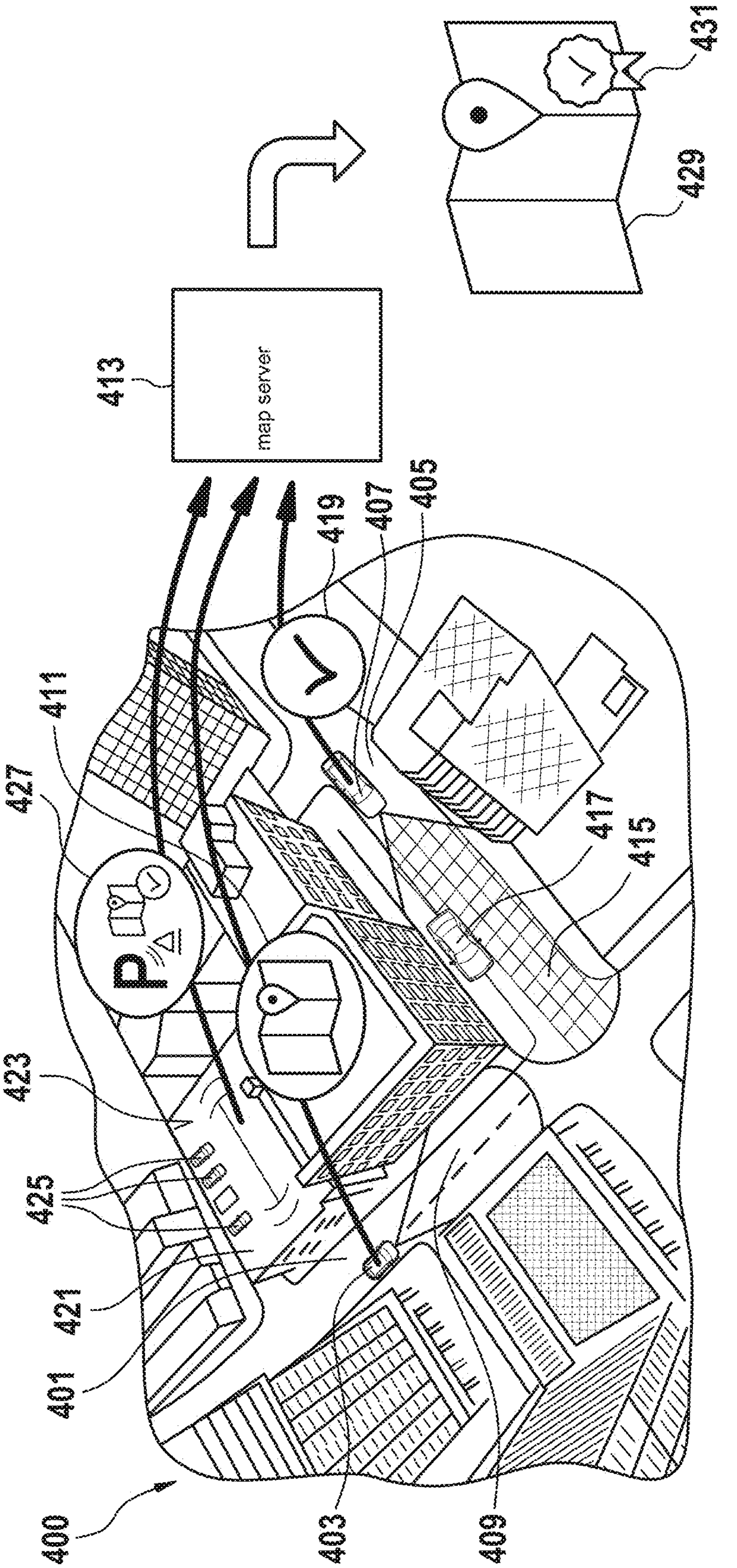
FIG. 4 shows an infrastructure according to an example embodiment of the present invention.

FIG. 4 shows an infrastructure 400 comprising a first road 401, on which a first motor vehicle 403 drives. The infrastructure 400 furthermore comprises a second road 405, on which a second motor vehicle 407 drives. The first road 401 is perpendicular to the second road 405.

Both motor vehicles 403, 407 comprise one or more environmental sensors for detecting an environment of the particular motor vehicle 403, 407.

An area detected in the environment of the motor vehicle 403 by means of an environmental sensor system of the first motor vehicle 403 is denoted by reference sign 409 and thus represents a section of the first road 401.

Based on this detection, the first motor vehicle 403 can carry out an initial mapping of the road section or the first road 401. As a result, this initial mapping provides an SD map, which is denoted by reference sign 411 in FIG. 4. The first motor vehicle 403 sends this SD map 411 to a map server 413, which is implemented in an edge infrastructure, for example. The map server 413 can thus also be implemented as an edge server.

Analogously, reference sign 415 denotes a detection range of the environmental sensors of the second motor vehicle 407, wherein the second motor vehicle 407 does not have to carry out an initial mapping of the second road 405, since it has already been mapped. The route section is therefore a route section that has already been mapped. However, based on the environmental detection of the environmental sensors of the second motor vehicle 407, the second motor vehicle 407 can verify the already mapped road section. In doing so, a temporary obstacle is detected, for example, which is, by way of example, a parked third motor vehicle 417 in FIG. 4. A result of the verification together with the information about the temporary obstacle 417 is provided with reference sign 419 in FIG. 4 and is sent by the second motor vehicle 407 to the map server 413.

The infrastructure 400 furthermore comprises a parking garage 421, with multiple motor vehicles 425 parked on a roof 423 of the parking garage 421, by way of example.

The parking garage 421 can, for example, be implemented or configured as an intelligent parking garage. This means that the parking garage 421 is configured, for example, for AVP operation of motor vehicles.

The abbreviation AVP stands for “automated valet parking.” As part of an AVP process, a motor vehicle is guided in an at least highly automated manner from a drop-off position to a parking position in the parking garage with the support of an infrastructure of the parking garage. From the parking position, the motor vehicle is guided in an at least highly automated manner to a pick-up position with the support of the infrastructure of the parking garage 421. This in particular takes place when the parking time has expired or when the driver requests a return.

The infrastructure of the parking garage 421 can thus detect a parking area or the driving routes in the parking garage 421 by using environmental sensors arranged within the parking garage 421 and can send corresponding information to the map server 413. This information is donated by reference sign 427 in FIG. 4. Such information includes, for example, an occupancy state of individual parking spaces.

Based on the information received, the map server 413 can create or verify a digital map of the road(s) or of the parking garage 421, as described above and/or below by way of example. Such a created and verified digital map is denoted by reference sign 429 in FIG. 4. The fact that this map has been verified by the map server 413 is symbolically shown by a guarantee seal with reference sign 431.

Figure 5:
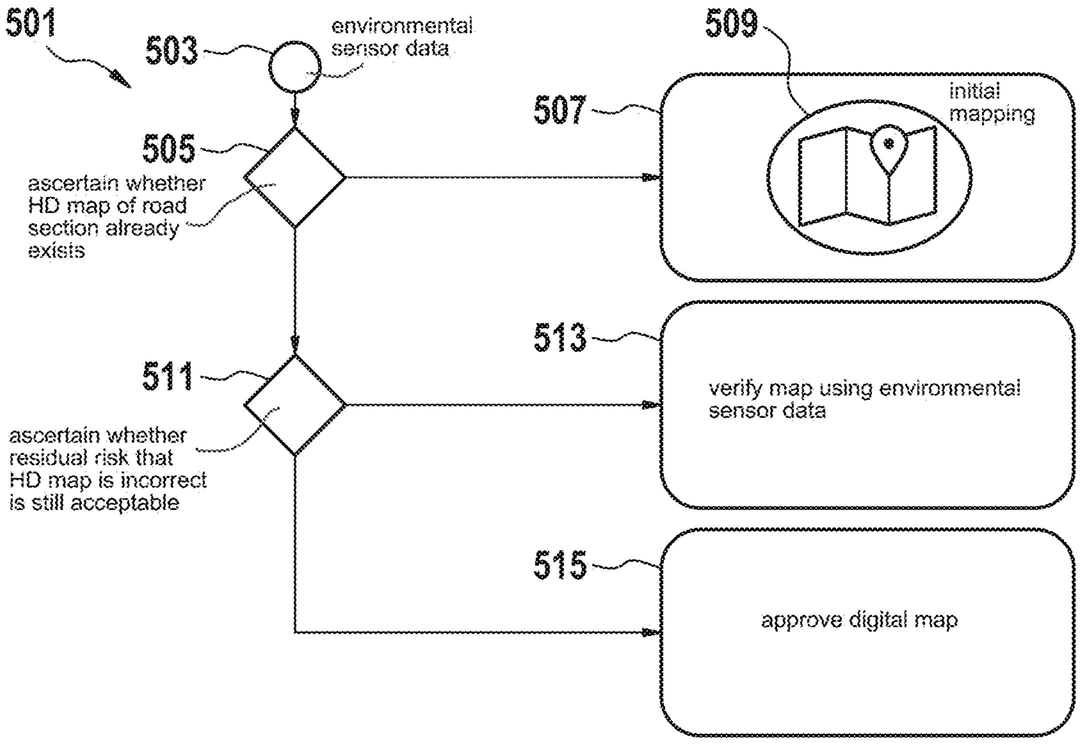
FIG. 5 shows a flow chart of an example method according to the first aspect of the present invention.

FIG. 5 shows a flow chart 501 of a method according to the first aspect. For example, automated mapping and, for example, verification of a digital map can be provided.

Environmental sensor data 503, which represent a road section, are received. In step 505, it is ascertained whether an HD map of the road section already exists. If not, an initial mapping of the road section takes place according to a step 507 by using the environmental sensor data. As a result of the initial mapping 507, an SD map 509 of the road section is created.

If it is determined in step 505 that an HD map of the road section already exists, it is ascertained in step 511 whether a residual risk that the HD map is incorrect is still acceptable. If not, the digital map is verified in step 513 by using the environmental sensor data 503. A combination of a set-based method and a probabilistic method is used here. Thus, not only are guarantees subject to the assumptions, but the assumptions are also assessed probabilistically. Only if the residual probability that assumptions have been violated falls below an accepted threshold is the HD map approved for an automated driving function, for example.

If it is determined in step 511 that the residual risk is acceptable, the digital map, i.e., the HD map, is approved for an automated driving function in step 515, wherein it may be provided, for example, that a plausibility check is carried out beforehand.

Figure 6:
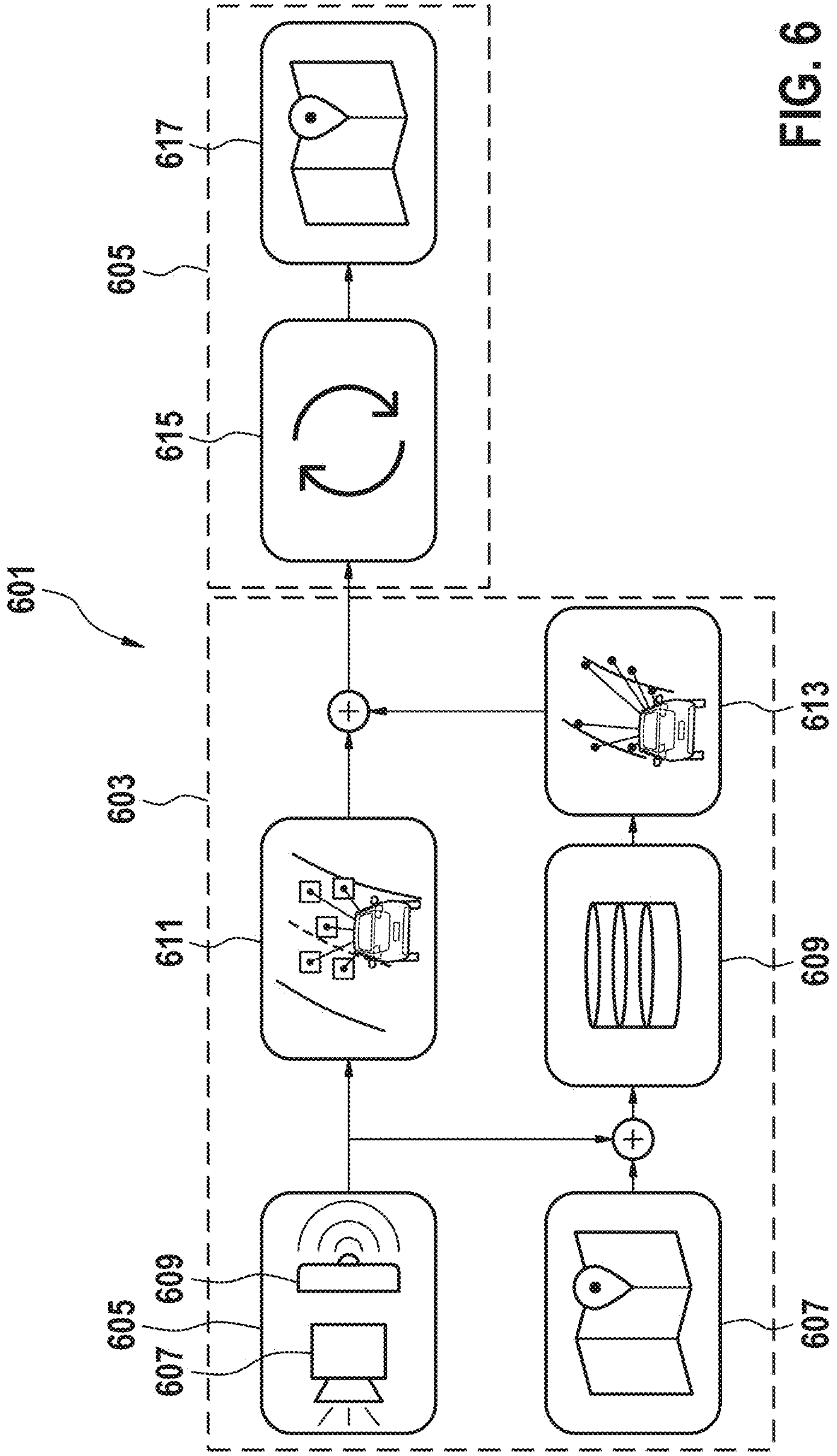
FIG. 6 shows a block diagram, which, by way of example, illustrates an initial mapping of a road section.

FIG. 6 shows a block diagram 601, which, by way of example, illustrates an initial mapping of a road section.

Reference sign 603 denotes a dashed quadrangle, which stands for an agent, i.e., for example, for a motor vehicle. This means that the function blocks located within block 603 are carried out by the agent, i.e., on the motor vehicle side.

Reference sign 605 denotes a dashed quadrangle, which symbolizes a map server. This means that the function blocks located within block 605 are executed by the map server.

According to a function block 605, an environmental sensor system, i.e., one or more environmental sensors, of the agent detects an environment of the agent. For example, the agent comprises a video camera 607 and a radar sensor 609. This environmental detection is used, for example, to roughly localize the agent so that, on the basis of an SD map 607, a suitable model for the current road section is selected from a database 609 of model templates. The environmental detection data, i.e., the environmental sensor data, can be used, for example, to adapt parameters of the selected model.

Furthermore, a set-based method can be used to describe the uncertainties in the environmental detection in the form of sets. This is carried out according to a function block 611.

Adapting the parameters of the selected model, as described above, is carried out according to a function block 613.

These uncertainties are combined with the adapted model, resulting in an HD map segment with tolerances.

In detail, an aggregation 615 of multiple measurement sequences from one or more agents takes place on the map server 605. In other words, the agent 603 sends a result of a combination of the uncertainties, i.e., the tolerances, with the adapted model to the map server 605. The map server thus receives corresponding information from multiple agents so that the aggregation can be carried out across multiple such measurements in order to achieve a required level of accuracy, for example.

Based on the aggregation 615, an HD map segment 617 of the road section can thus be created, wherein the map segment has tolerances.

In FIG. 6, the map server 605 is implemented separately from the agent 603. The agent 603 communicates its map model, including tolerances, to the map server 605 by means of I2X (“Infrastructure-to-X”) or V2X (“Vehicle-to-X”) communication, for example.

Figure 7:
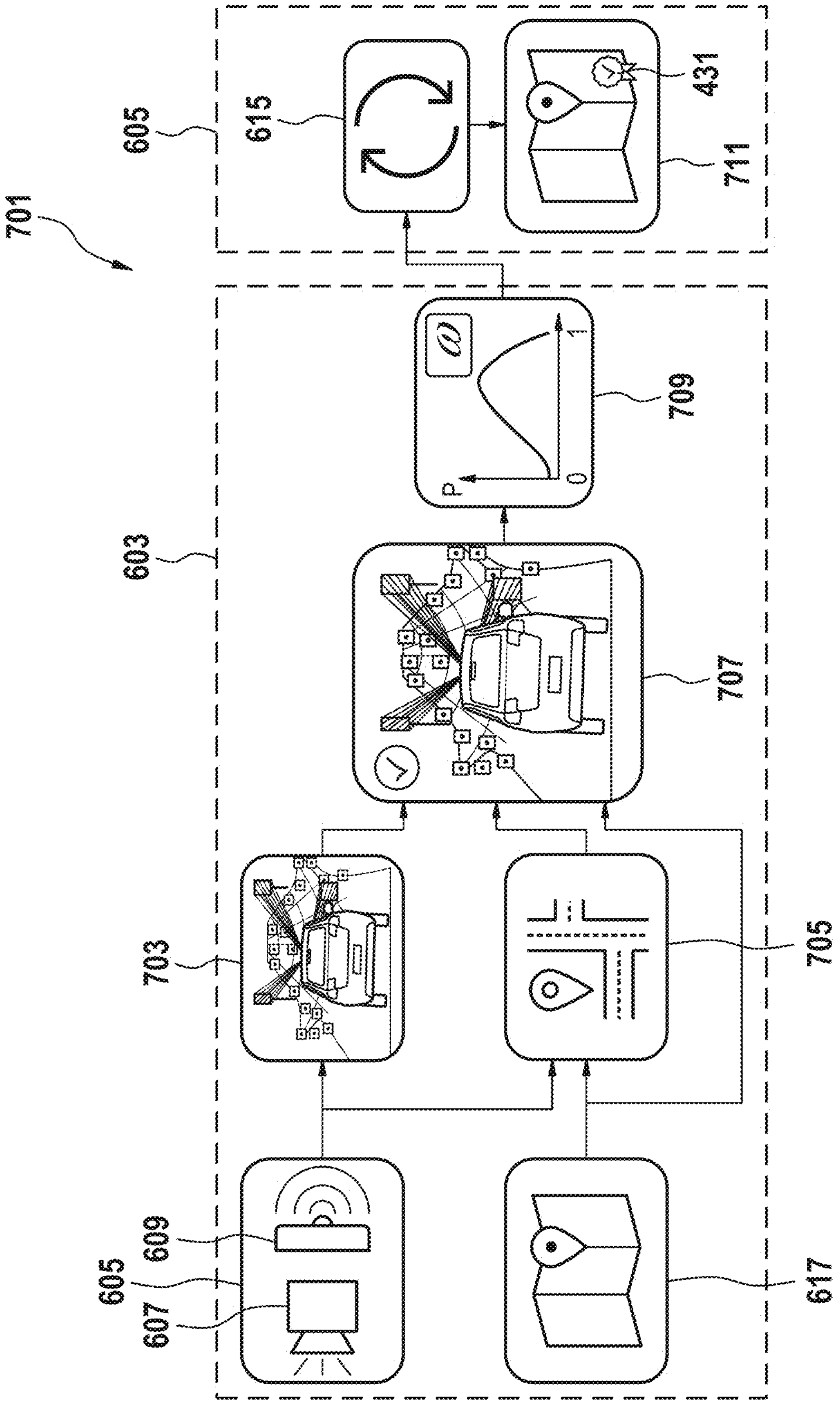
FIG. 7 shows a block diagram, which, by way of example, illustrates a verification process for a digital map of a road section.

FIG. 7 shows a block diagram 701, which, by way of example, illustrates a verification process of the HD map segment 617.

The HD map segment 617 is an example of a digital map that represents a road section.

By means of the environmental detection 605, features, such as landmarks, can, for example, be ascertained in the environment of the agent 603 according to a function block 703, so that the agent 603 can localize itself according to a function block 705, for example based on the associated landmarks or features from the digital map 617.

Based on the localization and the recognition of the features, the map features contained in the digital map 617 can be verified. This takes place according to a function block 707. For this purpose, a set-based method is used, so that the verification result is provided with appropriate guarantees. Subsequently, according to a function block 709, the assumptions on the basis of which the set-based method produced the guaranteed results, the verification result, are assessed probabilistically, i.e., by using a probabilistic method. For example, the probabilistic assessment is carried out by means of subjective logic. Furthermore, in FIG. 7, the agent 603 and the map server 605 are separated by way of example so that the agent communicates its verification result, including the probabilistic reliability assessment, to the map server 605 via V2X or I2X communication.

Analogously to FIG. 6, the map server can verify with sufficient certainty an aggregation 615 across multiple measurement sequences from multiple agents and/or from the one agent, provided that the agent has passed through the corresponding road section multiple times.

As a result of the aggregation 615 and the corresponding verification, the digital map 617 can then, for example, be verified. This verification is thus carried out according to a function block 711.

The map server 605 can then, for example, approve the digital map 617 for an automated driving function.

Figure 8:
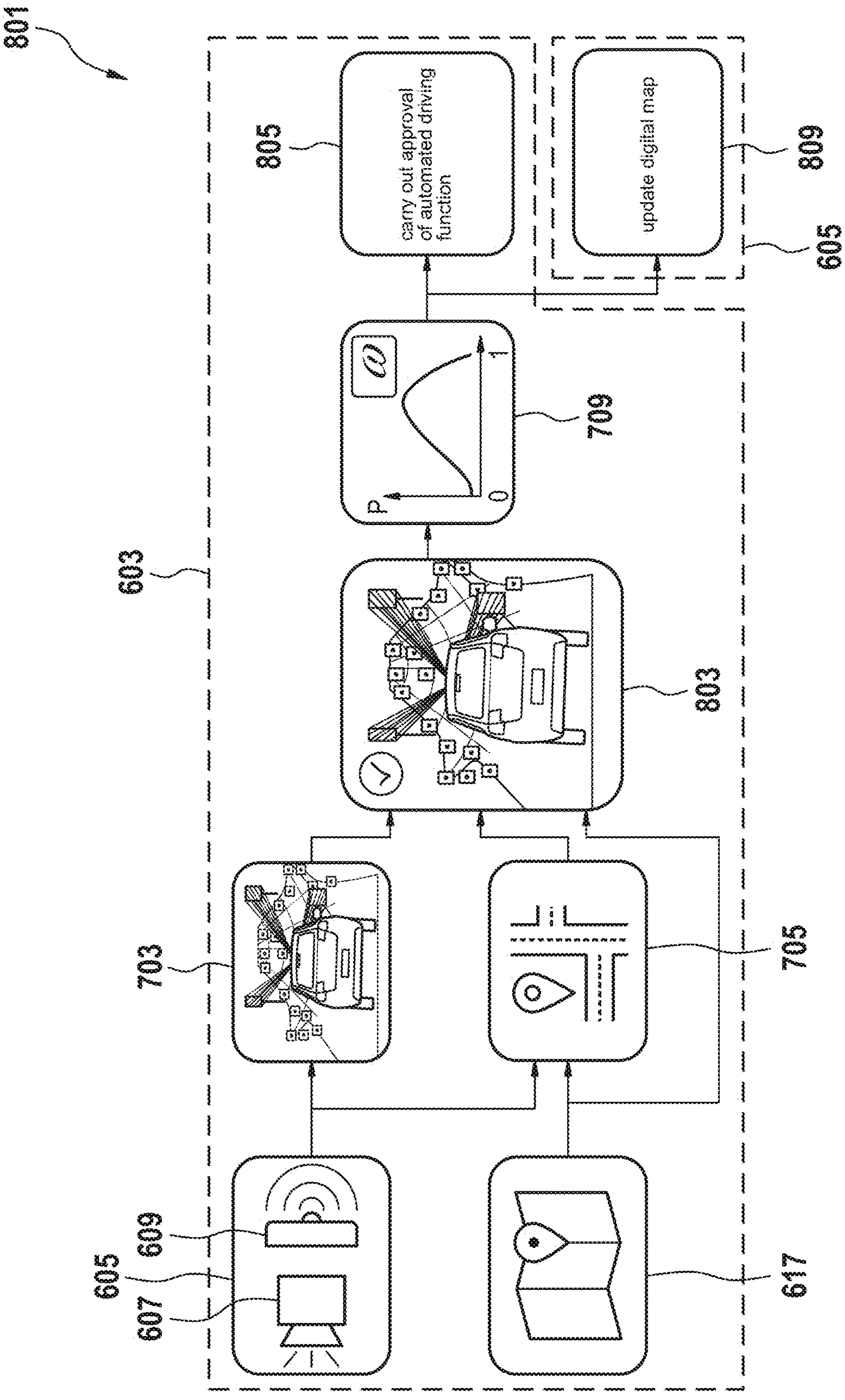
FIG. 8 shows a block diagram, which, by way of example, illustrates a plausibility check of a digital map of a road section.

FIG. 8 shows a block diagram 801, which, by way of example, illustrates a plausibility check. For example, if a map 617 that has already been approved exists, it is nevertheless checked for plausibility. The procedure is, for example, almost identical to the statements in connection with FIG. 7. However, a lower level of accuracy is permissible here, for example. If the approval of the digital map 617 is sufficiently plausible, the agent can activate an automated driving function. Otherwise, for example, a return to the driver of the agent is issued or a fallback to a mapless driving function can be initiated. For example, feedback is sent to the map server so that the digital map can be updated each time the road section is passed through.

The plausibility check, which is carried out on the motor vehicle side, is shown by block 803 in block diagram 801. The approval of the automated driving function is carried out according to block 805.

The update of the digital map is indicated by function block 809.

Here, too, the map server 605 and the agent 603 are separated so that the agent 603 communicates its feedback to the map server 605 via V2X or I2X communication.

What is claimed is:

1. A method for verifying a digital map of a road section, the method comprising the following steps:

receiving environmental sensor data based on a detection of the road section by an environmental sensor;

ascertaining, based on the environmental sensor data, a feature of the road section having a first tolerance;

verifying, based on the ascertained feature of the road section, a feature of the digital map corresponding to the ascertained feature and having a second tolerance, wherein a set-based method using the first and second tolerances is used to verify the feature of the digital map, to ascertain a verification result, wherein one or more assumptions are made for the set-based method, wherein the first tolerance represents a first range within which the ascertained feature is located and the second tolerance represents a second range within which the corresponding feature is located, and wherein an overlap between the first range and the second range is ascertained;

assessing a reliability of the one or more assumptions by using a probabilistic method;

verifying the digital map based on the verification result and based on the probabilistic reliability assessment, wherein verifying the digital map is performed based on the ascertained overlap; and performing an automated driving function of an at least partially automated motor vehicle using the verified digital map.

2. The method according to claim 1, wherein the one or more assumptions are each an element selected from the following group of assumptions: an assumption that the ascertained feature confirms a position of the feature of the digital map, an assumption that the ascertained feature is actually present, an assumption that static objects not recorded in the digital map were not systematically overlooked, an assumption that there are no systematic errors, an assumption that the digital map has not changed since its last update.

3. The method according to claim 1, wherein the probabilistic method is one of the following probabilistic methods: subjective logic, Dempster-Shafer theory, or classical probability theory including Bayesian inference.

4. The method according to claim 3, wherein the probabilistic method is the subjective logic, wherein a respective subjective logic opinion is set up in each case for each of the one or more assumptions, and wherein the respective subjective logic opinions are merged to form an overall result, which is projected onto a residual probability based on which the digital map is verified.

5. The method according to claim 4, wherein, when the ascertained feature is a temporary obstacle, a separate subjective logic opinion is set up in each case for the temporary obstacle and is merged with the respective subjective logic opinions to form the overall result.

6. The method according to claim 1, wherein, when there is no overlap, it is determined that the digital map has not been verified.

7. The method according to claim 1, wherein, based on the verification, the digital map is approved for use for an automated driving function.

8. The method according to claim 1, wherein, when the ascertained overlap indicates that the first range is within the second range, the digital map is verified.

9. A device configured to verify a digital map of a road section, the device comprising at least one computer configured to:

receive environmental sensor data based on a detection of the road section by an environmental sensor;

ascertain, based on the environmental sensor data, a feature of the road section having a first tolerance;

verify, based on the ascertained feature of the road section, a feature of the digital map corresponding to the ascertained feature and having a second tolerance, wherein a set-based method using the first and second tolerances is used to verify the feature of the digital map, to ascertain a verification result, wherein one or more assumptions are made for the set-based method, wherein the first tolerance represents a first range within which the ascertained feature is located and the second tolerance represents a second range within which the corresponding feature is located, and wherein an overlap between the first range and the second range is ascertained;

assess a reliability of the one or more assumptions by using a probabilistic method;

verify the digital map based on the verification result and based on the probabilistic reliability assessment, wherein the digital map is verified based on the ascertained overlap; and perform an automated driving function of an at least partially automated motor vehicle using the verified digital map.

10. A non-transitory machine-readable storage medium on which is stored a computer program for verifying a digital map of a road section, the computer program, when executed by a computer, causing the computer to perform the following steps:

receiving environmental sensor data based on a detection of the road section by an environmental sensor;

ascertaining, based on the environmental sensor data, a feature of the road section having a first tolerance;

verifying, based on the ascertained feature of the road section, a feature of the digital map corresponding to the ascertained feature and having a second tolerance, wherein a set-based method using the first and second tolerances is used to verify the feature of the digital map, to ascertain a verification result, wherein one or more assumptions are made for the set-based method, wherein the first tolerance represents a first range within which the ascertained feature is located and the second tolerance represents a second range within which the corresponding feature is located, and wherein an overlap between the first range and the second range is ascertained;

assessing a reliability of the one or more assumptions by using a probabilistic method;

verifying the digital map based on the verification result and based on the probabilistic reliability assessment, wherein the digital map is verified based on the ascertained overlap; and performing an automated driving function of an at least partially automated motor vehicle using the verified digital map.

* * * * *